US009908696B1

(12) United States Patent
Zevenbergen

(10) Patent No.: US 9,908,696 B1
(45) Date of Patent: Mar. 6, 2018

(54) PALLET-CONVEYOR SYSTEM

(71) Applicant: X Development LLC, Mountain View, CA (US)

(72) Inventor: John Zevenbergen, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/259,783

(22) Filed: Sep. 8, 2016

(51) Int. Cl.
*G06F 7/00* (2006.01)
*B65G 1/04* (2006.01)
*B65G 1/137* (2006.01)
*G06Q 10/08* (2012.01)

(52) U.S. Cl.
CPC ......... *B65G 1/0492* (2013.01); *B65G 1/1373* (2013.01); *G06Q 10/087* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 5,577,597 A * | 11/1996 | Kakida | B62D 65/18 198/346.2 |
| 6,076,683 A | 6/2000 | Okada et al. | |
| 6,401,936 B1 | 6/2002 | Isaacs et al. | |
| 6,505,093 B1 * | 1/2003 | Thatcher | B65G 1/1376 700/214 |
| 9,020,631 B1 * | 4/2015 | Bellavance | 700/213 |
| 2001/0048868 A1 | 12/2001 | Schuitema et al. | |
| 2008/0131255 A1 | 6/2008 | Hessler | |
| 2013/0177379 A1 * | 7/2013 | Hoffman | B65G 57/00 414/791.6 |
| 2014/0138213 A1 | 5/2014 | Magni et al. | |
| 2016/0140488 A1 * | 5/2016 | Lindbo | B65G 1/1373 705/28 |

FOREIGN PATENT DOCUMENTS

KR      10-0234884 B1     12/1999

* cited by examiner

*Primary Examiner* — Yolanda Cumbess
(74) *Attorney, Agent, or Firm* — McDonnell Boehnen Hulbert & Berghoff LLP

(57) ABSTRACT

Example pallet-conveyor systems may include a conveyor system configured with a delivery track arranged to move pallets to a delivery area, a recirculation loop, and a diverter mechanism. The system may include a computing system that selects an item for the recirculation loop based on future demand and causes a robotic device to maintain pallets of the selected item in the recirculation loop. The computing system may further receive an item request and determine that a requested item is available from the recirculation loop and responsively cause the diverter mechanism to divert the requested item from the recirculation loop to the delivery track. The computing system may also cause robotic devices to obtain and load pallets of remaining requested items onto the conveyer system for the delivery area, and cause pickers to remove one or more items from pallets at the delivery area in order to fulfill the item request.

20 Claims, 9 Drawing Sheets

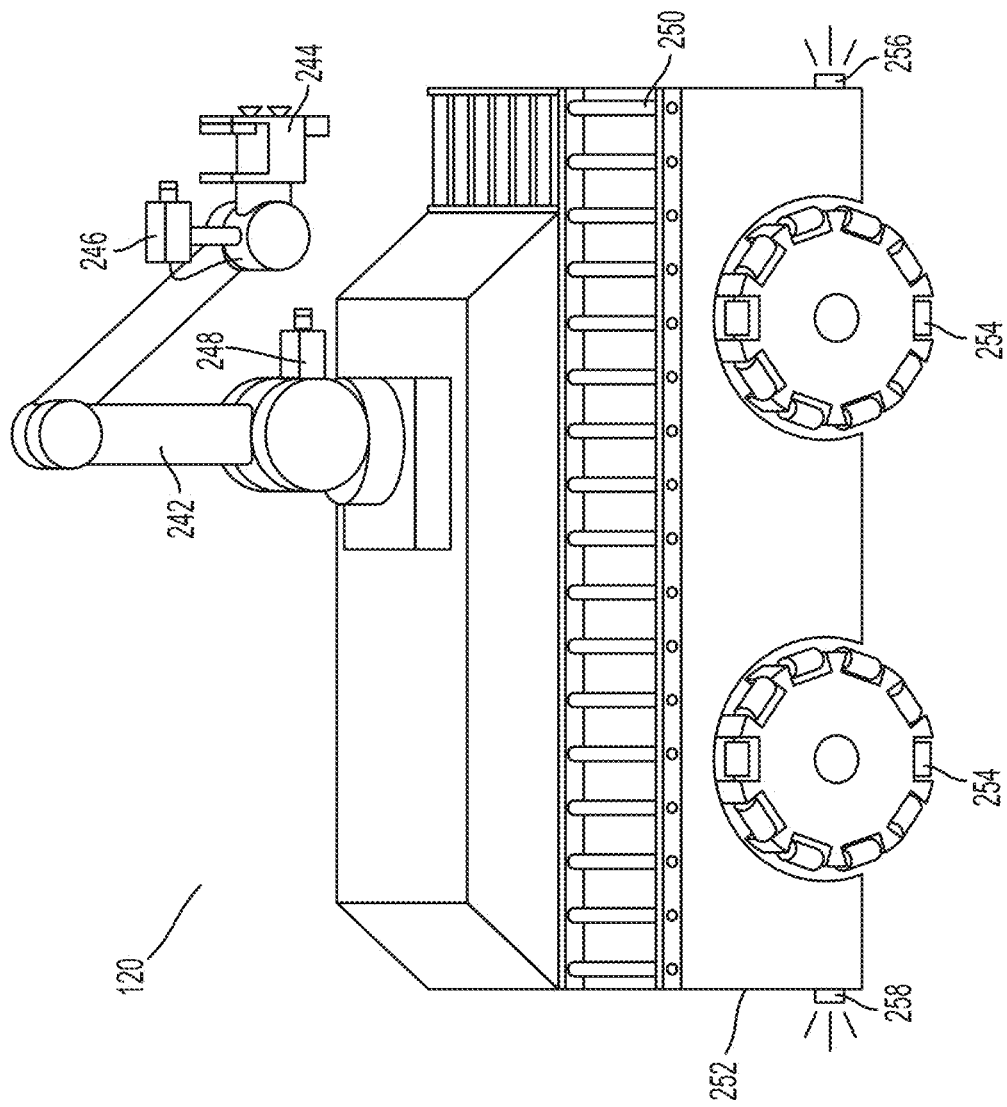

PALLET-CONVEYOR SYSTEM

BACKGROUND

A warehouse can store items for commercial entities, such as manufacturers, wholesalers, and transport businesses. The items can correspond to various goods, including raw materials, parts or components, and finished products. As such, the warehouse may store pallets holding various items in storage and may further include loading docks that enable the loading and unloading of goods from delivery trucks or other types of vehicles for storing pallets.

SUMMARY

Example implementations relating to pallet-conveyor systems are described herein. An example system may include a conveyor system configured with a delivery track arranged to move pallets to a delivery area and a recirculation loop that circulates selected pallets within the conveyor system. The conveyor system may also include a diverter mechanism that is operable to divert pallets to the delivery track. The example system may additionally include a computing system configured to perform processes, including selecting items to keep in circulation on the recirculation loop based on future demand values for the items and other possible considerations. In some instances, the computing system may operate mobile robotic devices to maintain a pallet of each selected item in the recirculation loop and may divert a selected item from the recirculation loop to the delivery track to fulfill a received item request. When the computing system determines that a requested item is not available in the recirculation loop, the computing system may control robotic devices to obtain and load pallets onto the conveyor system to enable pickers to remove requested items from pallets in order to fulfill item requests.

In one aspect, an example system is provided. The system may include a conveyor system that includes: (i) a delivery track arranged to move pallets to a delivery area, (ii) a recirculation loop, and (iii) a diverter mechanism. In some instances, the conveyor system is located in an environment comprising storage for a plurality of items, and the diverter mechanism is operable to divert a pallet to the delivery track. The system further includes a control system configured to perform a set of functions. For example, the control system may compare future demand values for at least two of the plurality of items and based on the comparison, select an item to keep in circulation on the recirculation loop. The control system may also cause a mobile robotic device to maintain a pallet of the selected item in circulation on the recirculation loop, receive an item request, and determine that a requested item is available from the recirculation loop. The control system may also cause the diverter mechanism to divert the requested item from the recirculation loop to the delivery track.

In another aspect, an example method is provided. The method may include selecting, at a computing system controlling a conveyor system located in an environment comprising storage for a plurality of items, an item to keep in circulation on a recirculation loop of the conveyor system based on future demand value for the item and causing a mobile robotic device to maintain a pallet of the selected item in circulation on the recirculation loop. The method may also include receiving, at the computing system, an item request, determining that a requested item is available from the recirculation loop and responsive to a determination that the requested item is available, causing a diverter mechanism of the conveyor system to divert the requested item from the recirculation loop to a delivery track of the conveyor system. In some instances, the diverter mechanism is operable to divert the pallet to the delivery track, and the delivery track is arranged to move pallets to a delivery area.

In a further aspect, a non-transitory computer-readable medium configured to store instructions, that when executed by a computing system configured to control a conveyor system, and to cause the computing system to perform functions. The functions may include comparing future demand values for at least two of a plurality of items located in an environment comprising the conveyor system and based on the comparison, selecting an item to keep in circulation on a recirculation loop of the conveyor system. The functions may also include causing a mobile robotic device to maintain a pallet of the selected item in circulation on the recirculation loop, and receiving an item request. The functions may further include determining that a requested item is available from the recirculation loop and causing a diverter mechanism to divert the requested item from the recirculation loop to a delivery track. In some instances, the delivery track is arranged to move pallets to a delivery area, and the diverter mechanism is operable to allow a pallet to recirculate on the recirculation loop.

In yet another aspect, a system may include means for a pallet-conveyor implementation. The system may include means for selecting one or more items to keep in circulation on a recirculation loop of a conveyor system located in an environment comprising storage for a plurality of items based on future demand values for the one or more items. The system may further include means for operating one or more mobile robotics to maintain at least one pallet of each selected item in circulation on the recirculation loop, and means for receiving one or more item requests, each indicating one or more items. The system may include means for determining that at least one requested item is available from the recirculation loop and means for causing a diverter mechanism of the conveyor system to divert the at least one requested item from the recirculation loop to a delivery track of the conveyor system. In some implementations, the diverter mechanism is operable to divert the given pallet to the delivery track, and the delivery track is arranged to move pallets to a delivery area. The system may further include means for causing a mobile robotic device to obtain a pallet of a remaining requested item and load the pallet onto the conveyor system, such that the remaining requested item is provided at the delivery area, and means for causing a picker device to remove one or more requested items from pallets at the delivery area in order to fulfill the item request.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 2E illustrates an example loading vehicle.

DETAILED DESCRIPTION

Figure 1:
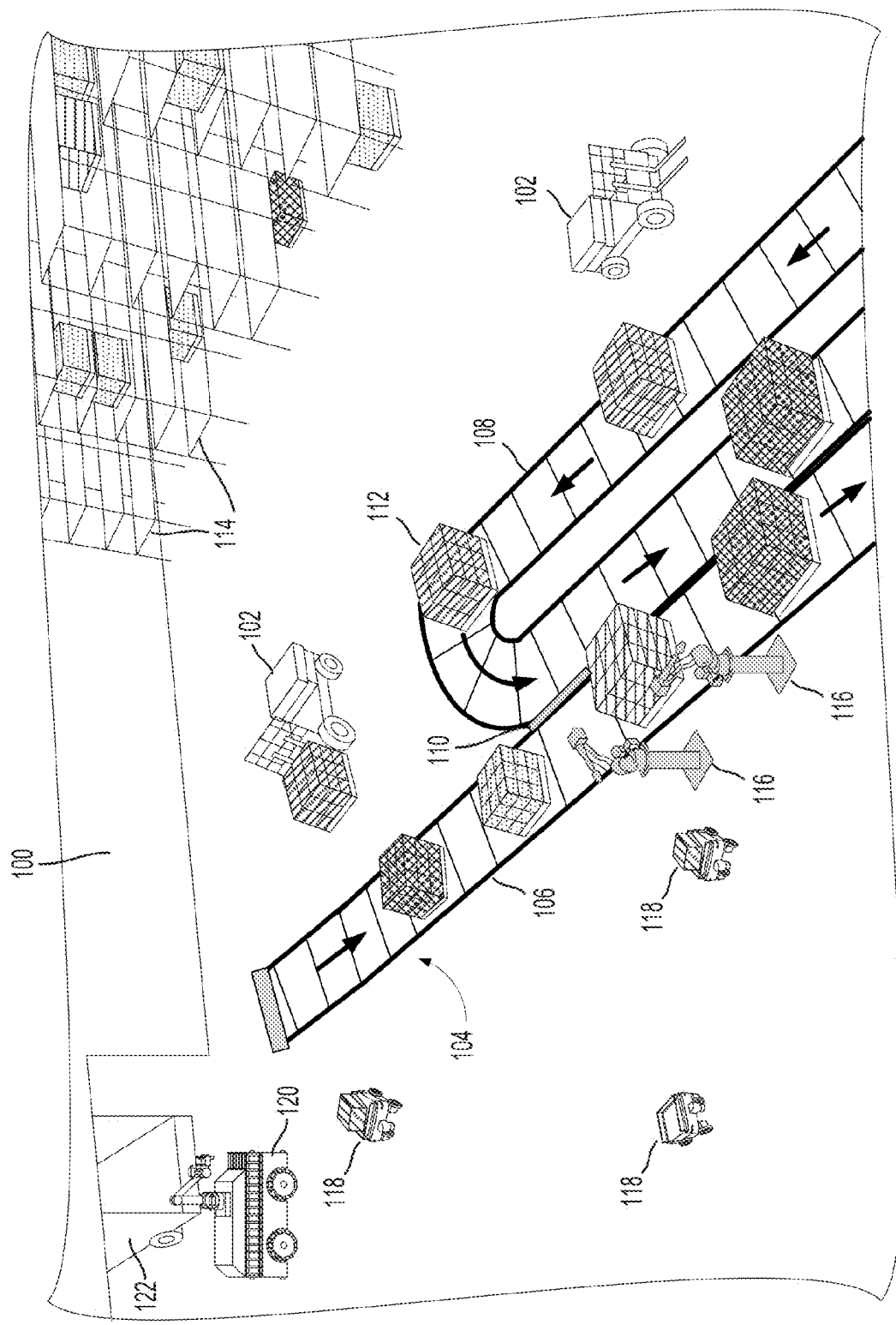
FIG. 1 illustrates an example pallet-conveyor system.

In the following detailed description, reference is made to the accompanying Figures, which form a part hereof. In the Figures, similar symbols typically identify similar components, unless context dictates otherwise. The illustrative implementations described in the detailed description, Figures, and claims are not meant to be limiting. Other implementations may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

As discussed above, various types of environments, such as warehouses and distribution centers are often arranged to store items such as raw materials, products, components, etc. In a warehouse, items may be stored on pallets, with each pallet holding a bulk amount of a particular item. Using pallets in this manner can help to improve organization and transportation of the items.

To further improve efficiency in a warehouse, mobile robotic devices and other types of vehicles may be utilized to retrieve requested items from storage and/or prepare the items for outbound delivery to fulfill received item requests. Vehicles, such as forklifts may pick up and transport pallets holding requested items from storage and drop off the pallets on one or more conveyor belts that transport the pallets nearby one or more pickers (e.g., people, robotic devices) so that the pickers can select requested items to assemble outbound packages according to the items requests. Pallet jacks can also serve as tools used to lift and move pallets between different locations within the warehouse. However, this process often requires vehicles to constantly retrieve pallets of items from different storage locations throughout an environment, which can result in delays and inefficient fulfillment of item requests. For example, delays can occur when pickers have to wait for the delivery of requested items from storage or for other possible reasons, such as traffic jams caused by too many vehicles transporting pallets of items back and forth between storage and the conveyor system.

Examples implementations of pallet-conveyor systems described herein may reduce unwanted delays and other inefficiencies that can arise when transporting items to fulfill item requests. An example system may include a conveyor system configured with a delivery track designed to move pallets of items to a delivery area where pickers can obtain requested items and a recirculation loop configured to keep selected pallets within the conveyor system. More specifically, the recirculation loop may circulate selected items nearby the delivery area for easier access rather than allowing the delivery track to carry the pallets to a repossession area where vehicles (e.g., forklifts) can pick up and return the pallets to storage. This way, the recirculation loop can reduce the number of trips required by vehicles and keep popular items readily available within the conveyor system rather than positioned in storage.

To control when pallets enter or leave the recirculation loop, the conveyor system may further include a diverter mechanism operable to allow a given pallet to recirculate on the recirculation loop or divert the pallet to the delivery track. The conveyor system may include a mechanical or electrical diverter mechanism that can transfer a pallet between the delivery track and recirculation loop of the conveyor system. In some instances, the diverter mechanism may place pallets onto a given track (e.g., delivery track, recirculation loop) that is also accessible to robotic devices. As such, the robotic devices may deliver items directly to the track and enable pickers to complete item requests with a combination of items from the recirculation loop and items received a la carte directly from the robotic devices.

In addition to the structural components of the conveyor system, the system may further include a control system configured to perform operations relating to the conveyor system, including selecting pallets for the recirculation loop and causing the diverter mechanism to release a circulated pallet to the delivery area when the pickers need one or more items on the pallet to fulfill item requests. For example, a computing system serving as the control system may determine and select items for the recirculation loop based on future demand for the items and other possible considerations, such as order trends for items, sale promotions for items, quality of the items, and storage locations for the pallets holding the items, among other possible considerations. The computing system can use a combination of considerations and weigh the different considerations in various ways when identifying items for circulation within the recirculation loop within examples.

After selecting that a given type of item should circulate within the recirculation loop, the computing system may operate one or more mobile robotic devices to position at least one pallet holding the given type of item into the recirculation loop. For example, the computing system may provide instructions to a forklift to obtain and deliver a pallet holding a selected type of item to the recirculation loop. The computing system can also cause the diverter mechanism to position a pallet holding a selected item into the recirculation loop.

Upon receiving an item request for one or more items stored within the environment, the computing system may process the request to position the requested items in the delivery area for pickers to assemble a package the fulfills the request accordingly. In some instances, an item request can come from a business or consumer and may specify an address for the delivery of requested items. As such, the computing system may receive an item request and initially determine if any requested items are currently circulating in the recirculation loop. For instance, the computing system may be configured to check an inventory that specifies types of items located in the recirculation loop. If the recirculation loop includes a requested item, the computing system may cause a diverter mechanism of the conveyor system to divert a pallet holding the requested item to the delivery track so that the pallet enters into the delivery area containing the pickers.

In some instances, the computing system may determine that an item request includes a request for an item or items that are not located within the recirculation loop. In response, the computing system may control one or more mobile robotic devices to obtain and load pallets that contain the remaining requested items onto the conveyor system so that the pickers may access the items to fulfill the item request. For instance, the computing system can instruct a forklift or another vehicle to transport a pallet holding the requested item from storage to the delivery track of the conveyor system so that the delivery track can transport the requested item to the delivery area. The computing system may utilize communications with the robotic devices as well as sensors information when providing instructions to the mobile robotic devices that can pick up and deliver pallets holding items required to complete item requests from storage.

In some implementations, the computing system may further be configured to control pickers that can assemble packages or other configurations using requested items to fulfill the item requests. For instance, the computing system may instruct one or more robotic arms positioned in the delivery area to select items from pallets in the conveyor system based on received item requests. In a further example, people can serve as the pickers and assemble packages by selecting items from pallets on the conveyor system in the delivery area. As such, a conveyor belt or other structure within the conveyor system may also serve as a physical barrier that prevents mobile robotic devices from accessing the area containing the people assembling the packages.

Referring now to the Figures, FIG. 1 illustrates an example pallet-conveyor system. As shown, pallet-conveyor system is located in environment 100 and includes forklifts 102, and conveyor system 104 configured with delivery track 106, recirculation loop 108, and diverter mechanism 110. The system additionally includes pallets (e.g., pallet 112), storage 114, robotic arms 116, autonomous guided vehicles (AGVs) 118, loading vehicle 120, and delivery truck 122. In other implementations, the system can include more or less components, including more or less robotic devices, additional conveyor belts or storage, etc.

Environment 100 can correspond to various types of spaces configured with storage for items, components, and/ or other possible materials. For example, environment 100 can be a warehouse, delivery center, distribution center or other type of space, and may include a fleet of robotic devices configured to perform various tasks, such as item processing and transportation, among other possible tasks. Environment 100 can also include components not shown in FIG. 1, such as a computing system configured to control mobile robotic devices, conveyor system 104, and/or other aspects of environment 100. The computing system may communicate with systems and devices in environment 100, including providing instructions to robotic devices and receiving information (e.g., sensor data) from robotic devices or other sensors operating in environment 100.

The robotic fleet shown in environment 100 can be configured to operate together to perform various operations, such as the organization and transportation of items. For instance, forklifts 102 may transport items (e.g., pallet 112) between conveyor system 104 and storage 114. For description purposes herein, transporting an item can correspond to the transportation of any type of material, item, product, component, or pallet, among other possibilities, and should not be limited to mean only the transportation of an item. Particularly, a mobile robotic device or other type of vehicle can transport items singularly or multiple items during a transportation trip. These items, components, materials, etc., may be positioned in various configurations, including positioned on pallets. As such, forklifts 102 may transport one or more pallets in order to move larger amounts of items during a single trip. The robot fleet is also shown having robotic arms 116 configured to pick up or otherwise manipulate items on pallets in conveyor system 104. For instance, robotic arms 116 may select and place requested items from conveyor system 104 into outbound packages to fulfill item requests. Additionally, robotic arms 116 may also be configured to transfer completed packages (e.g., packages holding all items of a corresponding received item request) onto other mobile robotic devices (e.g., AGVs 118) or other positions to further transport the packages.

Conveyor system 104 corresponds to a system of conveyors (e.g., conveyor belts) configured to transport items, pallets (e.g., pallet 112), etc., within environment 100. As shown, conveyor system 104 includes delivery track 106, recirculation loop 108, and diverter mechanism 110, but may include more or less components within other implementations. For instance, conveyor system 104 may include multiple recirculation loops or multiple delivery tracks in another implementation. Similarly, components of conveyor system 104 can have other configures, such as delivery track 106 extending into other areas of environment 100, among other possibilities.

As indicated above, conveyor system 104 may be configured to transport pallets in environment 100. For instance, delivery track 106 of conveyor system 104 can be configured to move items, pallets, or other materials to a delivery area where one or more pickers may be located to select items based on incoming item requests. Particularly, the delivery area may correspond to an area positioned nearby conveyor system 104 and may include pickers (e.g., people, robotic devices) that can select items from pallets in conveyor system 104 to assemble packages.

As shown in FIG. 1, delivery track 106 can exist as a conveyor belt that can move pallets to the delivery area, but can have other configurations in examples. Delivery track 106 can operate at various speeds, including having the ability to reverse direction or completely stop to allow pickers to select a high number of items from a given pallet. In an example implementation, a computing system of the pallet-conveyor system may adjust the speed and direction of the delivery track 106 and other components of conveyor system 104. In some implementations, delivery track 106 may transport items, pallets, or other materials to the delivery area and beyond the delivery area to a repossession area of conveyor system 104. More specifically, the repossession area may correspond to a portion of delivery track 106 or another component of conveyor system 104 where robotic devices (e.g., forklifts 112) and/or other vehicles can retrieve the pallets to return them to storage 114. In some examples, delivery track 106 may have a configuration that places the repossession area at a location within a threshold distance from storage, which may enable robotic devices or other devices to return the pallets back to storage quicker. Additionally, although an example conveyor system may include a repossession area, robotic devices and other vehicles may be configured to also pick up pallets at other positions of the conveyor system as well.

Conveyor system 104 can further include recirculation loop 108 configured to circulate selected pallets in conveyor system 104. Particularly, recirculation loop 108 may receive and circulate pallets, etc., selected by a computing system to keep the pallets nearby the delivery area. Within examples, the size, configuration, and other parameters (e.g., shape) of recirculation loop 108 can vary. In addition, in some implementations, a conveyor system can include multiple recirculation loops that can circulate selected pallets.

In a further implementation, recirculation loop 108 may share a conveyor belt with delivery track 106. For instance, recirculation loop 108 can extend from a first point on delivery track 106 positioned at the end of the delivery area and extend away from the delivery area to reconnect to the delivery track 106 positioned at the beginning of the delivery area. This way, recirculation loop 108 may transport pallets from the end of the delivery area back to the beginning of the delivery area. Recirculation loop 108 can also correspond to an area without conveyor belts. For instance, recirculation loop 108 can correspond to an area positioned nearby the pickers so that pallets positioned in the area are accessible by the pickers. Recirculation loop 108 can have other configurations within examples as well.

Conveyor system 104 may further include diverter mechanism 110 configured to allow a given pallet to recirculate on recirculation loop 108 or divert the pallet to delivery track 106. In some implementations, diverter mechanism 110 can correspond to a mechanical structure and/or an electrical configuration that enables the transfer of pallets between delivery track 106 and recirculation loop 108. Diverter mechanism 110 may be configured to operate based on instructions from a computing system configured to select pallets for recirculation loop 108. For instance, the computing system may actively control diverter mechanism 110 to send selected pallets in recirculation loop 108. Similarly, diverter mechanism 110 may also switch pallets between delivery track 106 and recirculation loop 108 based on incoming item requests and/or the delivery schedules of robotic devices transporting pallets in environment 100. In further examples, conveyor system 104 can include multiple diverter mechanisms positioned at different locations within conveyor system 104.

Environment 100 may be configured with storage 114 to store pallets, such as pallet 112. A pallet can correspond to a transport structure that supports items in a stable configuration during transportation and may enable efficient transportation of smaller items in bulk. The shape, size, and other parameters of pallets used within examples can vary. Additionally, each pallet may hold a different type of item with some pallets holding combinations of different types of items. Storage 114 can include physical structures that enable stacking and organization of pallets. As an example illustration, storage 114 may store pallets of items based on types of items or other parameters. In further examples, items can be labeled with some form of unique item identification label or marking that provides specific item information. Examples of unique item identification labels can include Uniform Product Code (UPC) and Stock-Keeping Unit (SKU) labels. As such, a computing system can reference the labels when fulfilling received item requests. In some instances, the identification labels can indicate a position of the items within storage 114.

Robotic arms 116 can correspond to robotic devices configured with manipulators for transferring items from pallets to assemble packages to fulfill requests for those items. For example, robotic arms 116 can have stationary positions within the delivery area that enables manipulators of robotic arms 116 to select items from pallets positioned on delivery track 106 proximate to the delivery area. As such, robotic arms 116 can serve as pickers to assist in assembling outbound packages that include requested items. In some implementations, robotic arms 116 can have other positions within environment 100, including respective positions that enable robotic arms 116 to transfer completed packages onto other mobile robotic devices (e.g., AGVs 118) for outbound transportation. Additionally, in further examples, robotic arms 116 can also be non-stationary with physical mechanisms that enable movement by robotic arms 116 within environment 100.

As indicated above, AGVs 118 can correspond to autonomous robotic devices configured to transport items and/or packages throughout environment 100. For instance, an AGV may receive a package from a given robotic arm and transport the package to loading vehicle 120 for placement into delivery truck 122. Similar to other robotic devices, loading vehicle 120 corresponds to another type of mobile robotic device that can be configured to transport items, packages, and other materials.

Figure 2A:
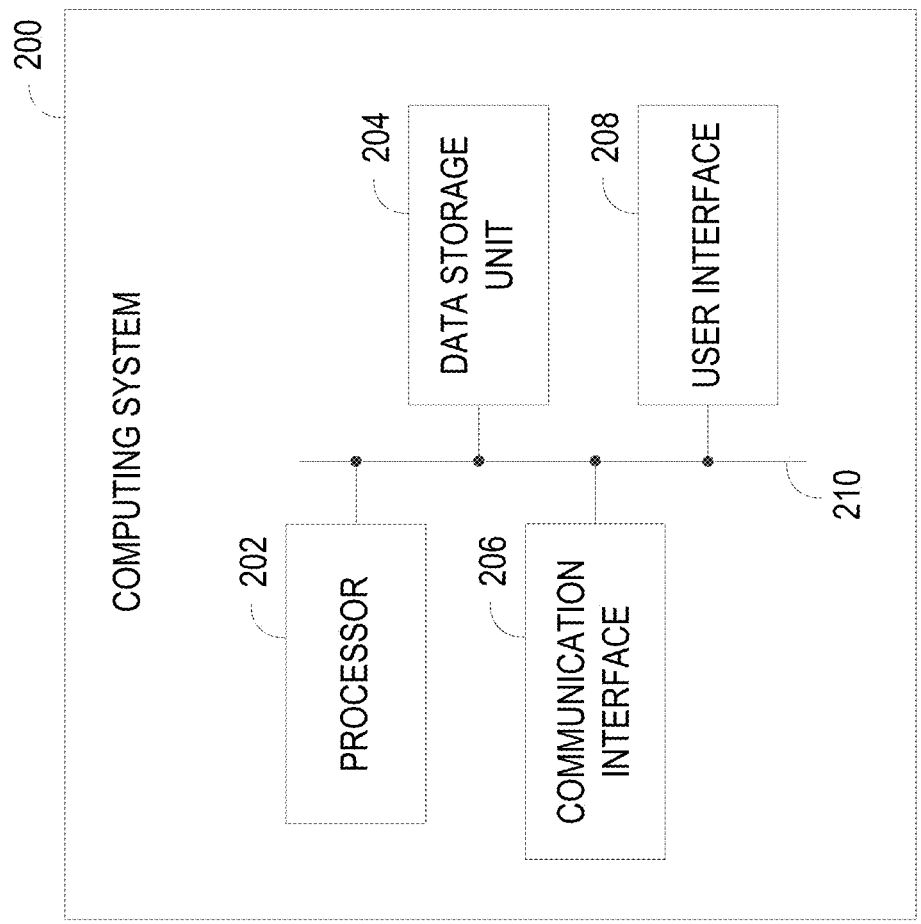
FIG. 2A is a simplified block-diagram of an example computing system.

FIG. 2A is a simplified block-diagram of an example computing system 200 that can perform various acts and/or functions, such as those described in this disclosure. For instance, computing system 200 can serve as a control system and control aspects of environment 100, including controlling operations of robotics devices and conveyor system 104. As such, computing system 200 can include various components, such as processor 202, data storage unit 204, communication interface 206, and/or user interface 208. The components of computing system 200 can be connected to each other (or to another device, system, or other entity) via connection mechanism 210. In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless). Computing system 200 can include more or less components in other example implementations.

In some implementations, computing system 200 can operate as a control system and further include separate systems for controlling the conveyor system and controlling robotic devices. For example, computing system 200 may communicate with other computing devices to form the control system that coordinates operations between the conveyor system and robotic devices. An example control system may have other configurations within implementations, such as operating as a single or multiple entities. For instance, a control system in basic form can include a processor, data storage with program instructions, and communication interfaces for sending control instructions to other systems, such as robotic devices and conveyor systems.

Processor 202 may correspond to a general-purpose processor (e.g., a microprocessor) and/or a special-purpose processor (e.g., a digital signal processor (DSP)). In some instances, computing system 200 may include a combination of processors.

Data storage unit 204 may include one or more volatile, non-volatile, removable, and/or non-removable storage components, such as magnetic, optical, or flash storage, and/or can be integrated in whole or in part with processor 202. As such, data storage unit 204 may take the form of a non-transitory computer-readable storage medium, having stored thereon program instructions (e.g., compiled or non-compiled program logic and/or machine code) that, when executed by processor 202, cause computing system 200 to perform one or more acts and/or functions, such as those described in this disclosure. Computing system 200 can be configured to perform one or more acts and/or functions, such as those described in this disclosure. Such program instructions can define and/or be part of a discrete software application. In some instances, computing system 200 can execute program instructions in response to receiving an input, such as from communication interface 206 and/or user interface 208. Data storage unit 204 may also store other types of data, such as those types described in this disclosure.

Communication interface 206 can allow computing system 200 to connect to and/or communicate with another other entity according to one or more protocols. In an example, communication interface 206 can be a wired interface, such as an Ethernet interface or a high-definition serial-digital-interface (HD-SDI). In another example, communication interface 206 can be a wireless interface, such as a cellular or WI-FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 208 can facilitate interaction between computing system 200 and a user of computing system 200, if applicable. As such, user interface 208 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 208 can include hardware and/or software components that facilitate interaction between computing system 200 and the user of the computing device system.

As indicated above, computing system 200 may be configured to control aspects of environment 100, such as coordinating operation of robotic devices operating in environment 100 and controlling aspects of conveyor system 104. For instance, computing system 200 may determine delivery schedules for forklifts 102 that indicate when each forklift will deliver or pick up a given pallet at conveyor system 104. In some instances, computing system 200 may determine a delivery schedule for a given robotic device that includes a series of operations of the robotic device. As an example, computing system 200 may determine a delivery schedule that indicates operations for forklift 102 for an entire period of time (e.g., 12 hours) and adjust the delivery schedule using subsequent information received from forklift 102 (e.g., sensor data), other robotic devices, and/or other systems (e.g., a sensor system) positioned in environment 100. In some implementations, computing system 200 may be configured coordinate operations for multiple robotic devices, including aligning delivery schedules so that robotic devices do not generate excess traffic nearby conveyor system 104. For instance, computing system 200 may assign pick up and deliveries of pallets using future demand values for items stored on said pallets in storage 114 in environment 100 for the robotic fleet. This way, computing system 200 may prevent a robotic device (e.g., forklift 102) from traveling extra distance when another robotic device is free and capable of picking up the same pallet while traveling a shorter distance.

Computing system 200 may also be configured to control conveyor system 104, including delivery track 106, recirculation loop 108, and diverter mechanism 110. For instance, computing system 200 may control the direction and speed at which deliver track 106, recirculation loop 108, and other components of conveyor system 104 transport pallets. As an example, computing system 200 may stop delivery track 106 when a given pallet is positioned in front of pickers, such as robotic arms 116 to enable the pickers to assemble packages based on received incoming requests. Computing system 200 may further be capable of controlling diverter mechanism 110 to select pallets for entering and leaving recirculation loop 108. As such, computing system 200 may choose which pallets remain located within conveyor system 104 and which pallets may be returned back to storage 114 by robotic devices (e.g., forklift 102A and forklift 102B).

Figure 2B:
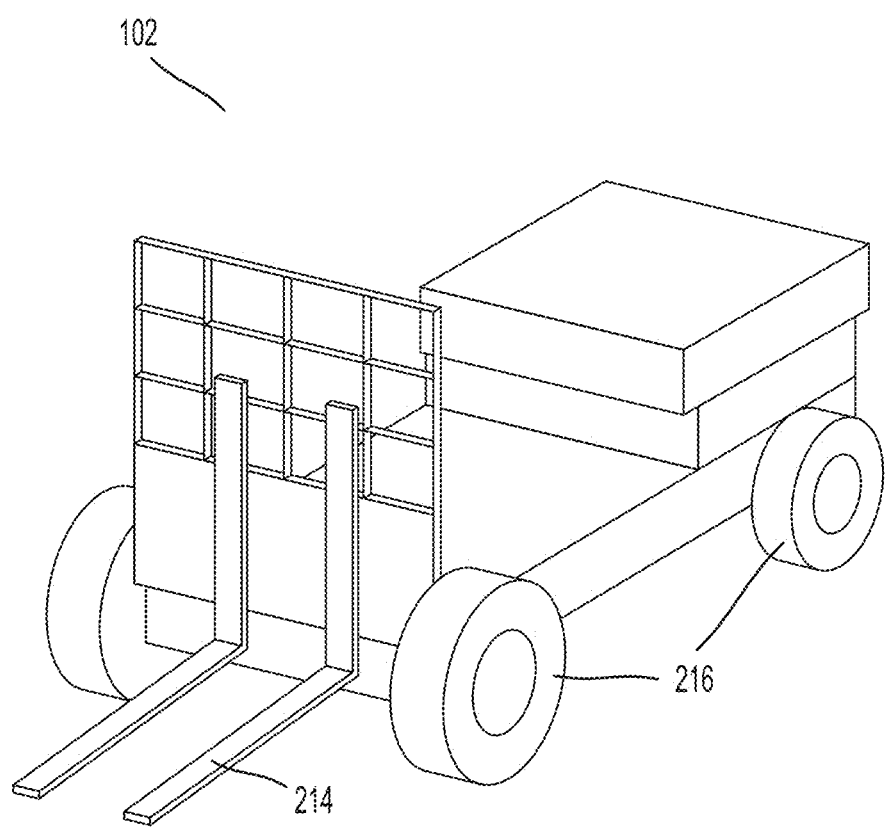
FIG. 2B illustrates an example forklift.

FIG. 2B shows example forklift 102, which illustrates one possible representation of a mobile robotic device that can transport pallets and items in an environment. In other implementations, forklift 102 can have different configurations. As shown, forklift 102 includes forklift mechanism 214 that can lift and move pallets or items. In some examples, forklift 102 may elevate forklift mechanism 214 to reach different racks of a storage rack or other fixed storage structure. Forklift 102 also includes wheels 216 that enable locomotion to transport pallets or items. Additionally, forklift 102 may include other components, such as a motor, power supply, sensor system, etc.

In some implementations, forklift 102 may operate autonomously. For instance, forklift 102 may communicate with a computing system that controls aspects (e.g., conveyor system 104) of environment 100 and perform operations based on instructions from the computing system. Forklift 102 can also be operated by a human operator in some examples.

Figure 2C:
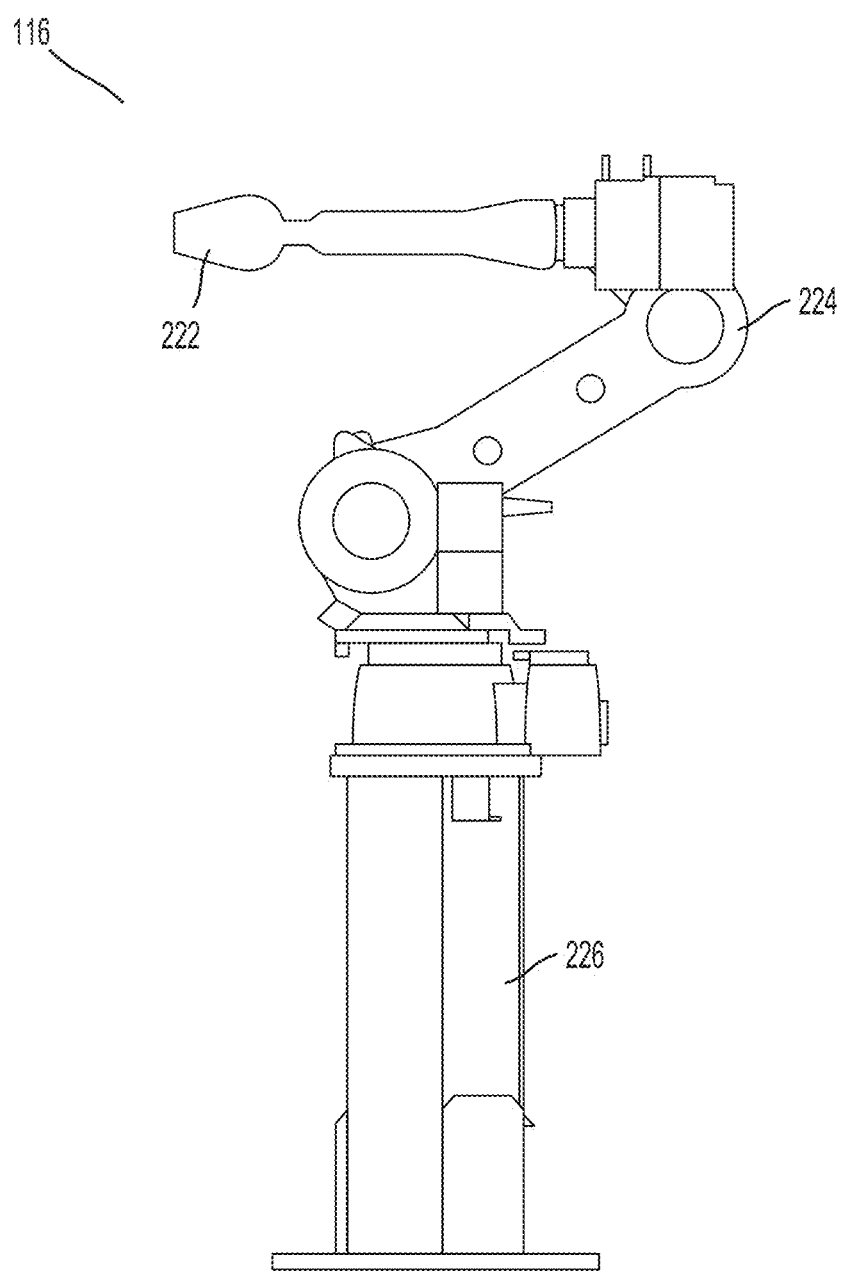
FIG. 2C illustrates an example robotic arm configured on a pedestal.

FIG. 2C illustrates example robotic arm 116. As shown, robotic arm 116 includes gripper 222, manipulator 224, and pedestal 226, but may include more or less components within other example implementations. For instance, in another example implementation, robotic arm 116 can include multiple manipulators. Robotic arm 116 can have a stationary position (e.g., in a delivery area) in environment 100 that enables robotic arm 116 to pick up, move, and/or otherwise manipulate items within reach, such as items positioned on pallets. Robotic arm 116 can also have a non-stationary configuration that enables robotic arm 116 to change position. For example, robotic arm 116 can include wheels or have a position on a track that enables changes in position and orientation.

As shown in FIG. 2C, robotic arm 116 includes manipulator 224 configured with gripper 222. The combination of manipulator 224 and gripper 222 can enable robotic arm 116 to pick up and move nearby items, such as to compile items in packages and/or to distribute items or packages to another mobile robotic devices. Robotic arm 116 can include other grippers or other manipulators within other implementations. In some examples, robotic arm 116 may also be operable to construct and/or deconstruct pallets or other items. Pedestal 226 can serve as a base for robotic arm 116 and can have various configurations within examples. In some instances, pedestal 226 can include an actuator to enable a control system to adjust the height of robotic arm 116. In additional examples, robotic arm 116 may also include one or more sensors to identify items, pallets, and/or other robotic devices within the vicinity of robotic arm 116.

Figure 2D:
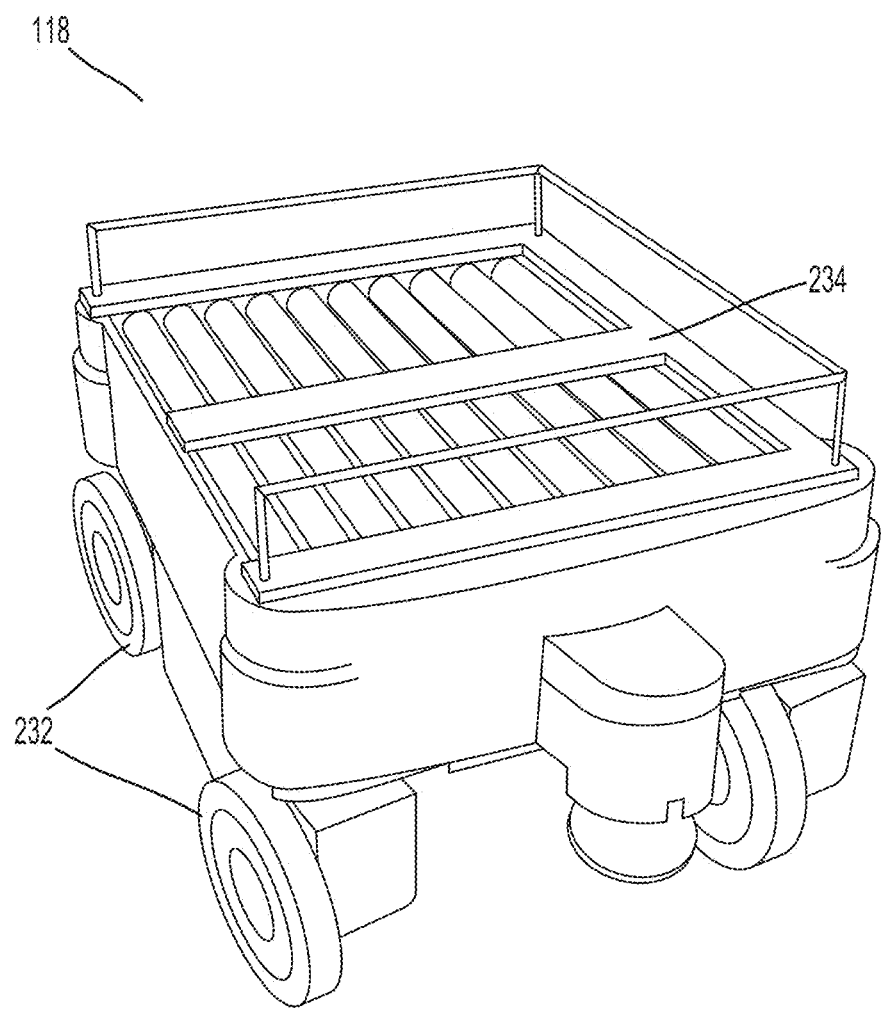
FIG. 2D illustrates an example autonomous guided vehicle.

FIG. 2D shows example autonomous guided vehicle (AGV) 118. As such, AGV 118 can have configuration that enables transportation of individual items, packages, or other possible materials throughout a space, such as environment 100. AGV 118 may include wheels 232 and/or other mechanisms that allow for locomotion, and may use top surface 234 for placing items, packages, or other materials for transport. In some examples, top surface 234 may include rotating conveyors to move objects to or from AGV 118. AGV 118 may utilize power from various sources, such as batteries. In further examples, AGV 118 may additionally include other components not specifically identified here, such as sensors for navigation. AGVs with different shapes and sizes also may be included within a robotic fleet, possibly depending on the types of packages handled in the space.

FIG. 2E illustrates an example loading vehicle 120. Loading vehicle 120 may include robotic arm 242 with gripping component 244 for gripping objects within the environment. Robotic arm 242 may use gripping component 244 to pick up and place packages to load or unload trucks or other containers. Loading vehicle 120 may also include moveable cart 252 with wheels 254 for locomotion. Additionally, wrap around front conveyor belt 250 may be included on loading vehicle 120. In some examples, wrap around front conveyer belt 250 may allow loading vehicle 120 to unload or load packages from or to a truck container or pallet without having to rotate gripper 244.

In further examples, a sensing system of loading vehicle 120 may use one or more sensors attached to robotic arm 242, such as sensor 246 and sensor 248, which may be two-dimensional (2D) sensors and/or 3D depth sensors that sense information about the environment as robotic arm 242 moves. The sensing system may determine information about the environment that can be used by a control system (e.g., a computer running motion planning software) to pick and move packages or items efficiently. The control system could be located on the device or could be in remote communication with the device. In further examples, scans from one or more 2D or 3D sensors with fixed mounts on a mobile base, such as front navigation sensor 256 and rear navigation sensor 258, and one or more sensors mounted on robotic arm 242 may be integrated to build up a digital model of the environment, including the sides, floor, ceiling, and/or front wall of a truck or other container. Using this information, the control system may cause the mobile base to navigate into a position for unloading or loading.

Figure 3:
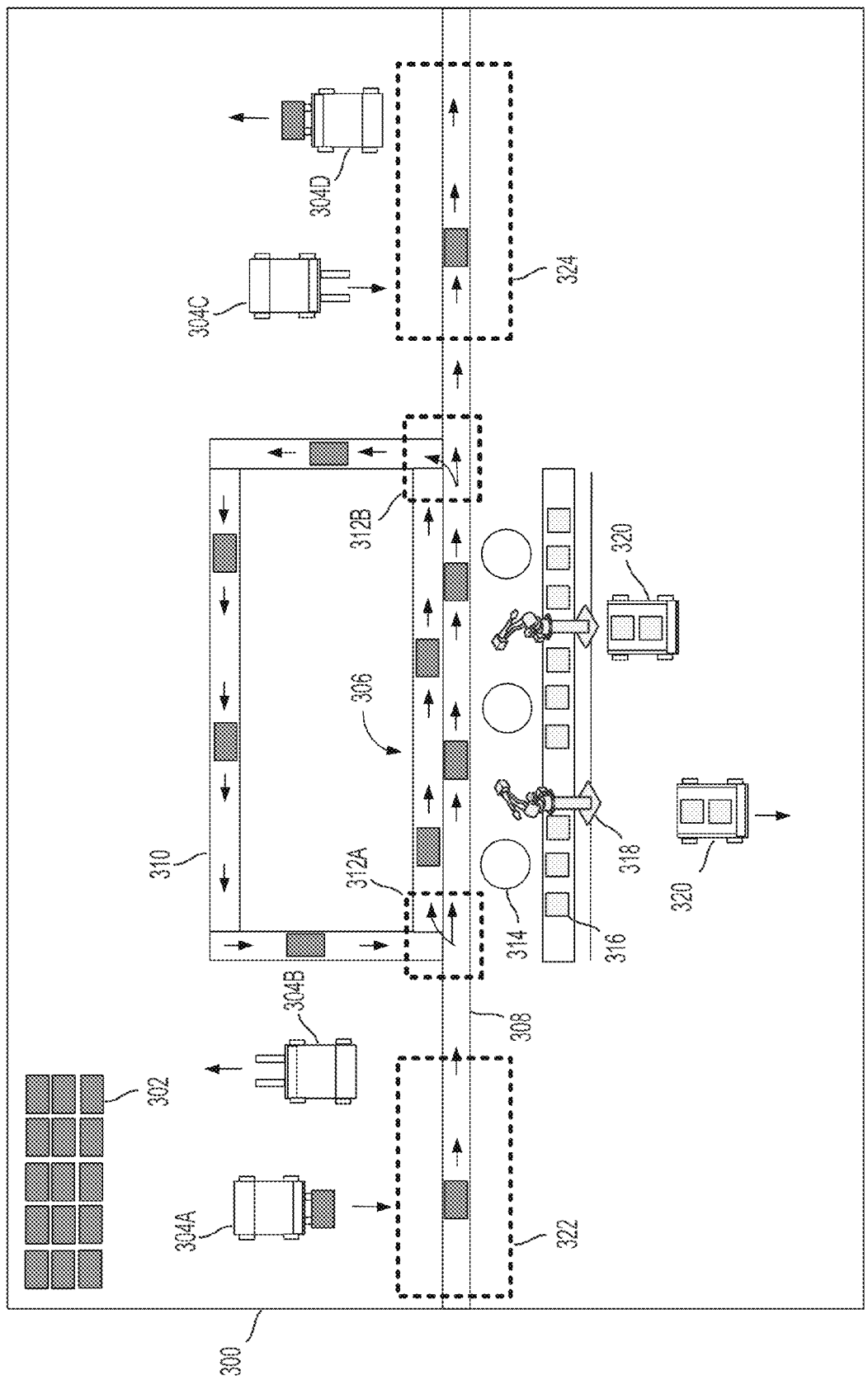
FIG. 3 depicts another example pallet-conveyor system.

FIG. 3 depicts another example pallet-conveyor system. Similar to the example pallet-conveyor system depicted in FIG. 1, the example system illustrated in FIG. 3 shows environment 300 with various contents, including storage 302, mobile robotic devices (mobile robotic device 304A, mobile robotic device 304B, mobile robotic device 304C, mobile robotic device 304D), and conveyor system 306 configured with delivery track 308, recirculation loop 310, diverter mechanism 312A, and diverter mechanism 312B. In addition, environment 300 also includes pickers (e.g., picker 314), packages (e.g., package 316), robotic arms 318, and AGVs 320. Although the components illustrated in FIG. 3 can fully implement a pallet-conveyor system, other example systems can include more or less components, including additional conveyors, and robotic devices, etc.

Storage 302 represents an area of environment 300 that may hold items, pallets, or other possible materials, and may include physical structures (e.g., shelves) that enable the organization of pallets or items. Although storage 302 is shown positioned in the upper left corner of environment 300, storage 302 can have locations in other areas of environment 300 in other implementations.

Mobile robotic devices 304A-304D represents the various types of robotic devices that may transport items, pallets, etc., in environment 300. As such, the type and configuration of mobile robotic devices 304A-304D can vary within implementations. For instance, mobile robotic device 304A can correspond to a forklift that can retrieve pallets of items from storage 302 and drop off the pallets in conveyor system 306. During operation, mobile robotic devices 304A-304D can communicate with a computing system controlling conveyor system 306 and may be configured to perform operations according to instructions provided by the computing system. Mobile robotic devices 304A-304D may also provide information to the computing system, such as delivery times and other information relating to the transportation of pallets.

As shown, conveyor system 306 is configured to transport items and pallets throughout environment 300, and further includes delivery track 308, recirculation loop 310, and diverter mechanisms 312A-312B. Conveyor system 306 can include ground level or elevated conveyor belts and/or other types of mechanical structures configured to transport pallets holding items. As such, the size, configuration, general layout, and other parameters of conveyor system 306 can differ in example implementations.

Delivery track 308 is shown extending from the left boundary of environment 300 to the right boundary of environment 300, but can have other positions. In some implementations, delivery track 308 may extend into multiple rooms of an environment and may have other configurations, such as a circular or rectangular configuration that does not include a start and end point overall. In some implementations, conveyor system 306 can further include multiple delivery tracks configured to transport pallets to one or more delivery areas. For instance, a large environment may include multiple delivery tracks that can transport pallets to different delivery areas containing pickers that assemble outbound packages according to incoming item requests.

As shown, delivery track 308 can include drop off area 322 (e.g., pallet delivery area) and repossession area 324 that represent potential locations where mobile robotic devices, such as mobile robotic devices 304A-304D, may deliver and retrieve pallets, respectively. However, in some implementations, the mobile robotic devices can also deliver and retrieve pallets and items to different portions of conveyor system 306, such as directly to recirculation loop 310.

Recirculation loop 310 is shown as a physically separate rectangular conveyor belt with one belt positioned proximate to delivery track 308 to enable diverter mechanisms 312A-312B to transfer pallets between recirculation loop 310 and delivery track 308. However, in other implementations, recirculation loop 310 can utilize a portion of delivery track 308, such as the portion of delivery track 308 positioned in the delivery area nearby pickers 314. As shown in FIG. 3, recirculation loop 310 may receive and circulate selected pallets to maintain the pallets in conveyor system 306. This way, a computing system can choose pallets to keep nearby pickers rather than allowing delivery track 308 to transport the pallets to repossession area 324 for mobile robotic devices to pick up and return to storage 302.

As shown, conveyor system 306 can include one or more diverter mechanisms, such as diverter mechanism 312A and diverter mechanism 312B that can manipulate when a pallet enters or leaves recirculation loop 310. More specifically, in the example system illustrated in FIG. 3, diverter mechanism 312A may be configured to transport selected pallets into recirculation loop 310 prior to the pallets reaching the delivery area containing pickers 314. Diverter mechanism 312A may also transfer circulated pallets back on delivery track 306 so that pickers 304 may select requested items from the pallets. Similarly, diverter mechanism 312B may be configured to divert pallets into recirculation loop 310 after delivery track 306 carries the pallets through the delivery area. Diverter mechanism 312B may also divert pallets circulating in recirculation loop 310 back on delivery track 306 to repossession area 324.

In some implementations, conveyor system 306 may include only diverter mechanism 312A or diverter mechanism 312B. Similarly, conveyor system 306 may also include other diverter mechanisms with different positions in conveyor system 306.

Environment 300 further includes pickers 314 positioned in the delivery area nearby delivery track 308. Pickers 314 may select items from pallets positioned on delivery track 308 to place into packages. For instance, pickers 314 may select items based on received item requests to assemble packages that correspond to the requests for outbound delivery. As indicated above, pickers 314 can correspond to robotic devices or people that may select items from pallets in delivery area as the pallets travel on delivery track 306.

Robot arms 318 may transport packages 316 from an assembling position to AGVs 320 for further transportation. As shown in FIG. 3, robot arms 318 can adjust positions along the assembling area to pick up different packages 316 as pickers 314 complete placing requested items within packages 316. In other implementations, robot arms 318 can operate as pickers and assemble packages according to incoming item requests. AGVs 320 may transport packages 316 to another location of environment 300, such as an area containing a loading vehicle, other vehicles, or people that can place the completed packages 316s into a delivery truck for outbound delivery.

Figure 4:
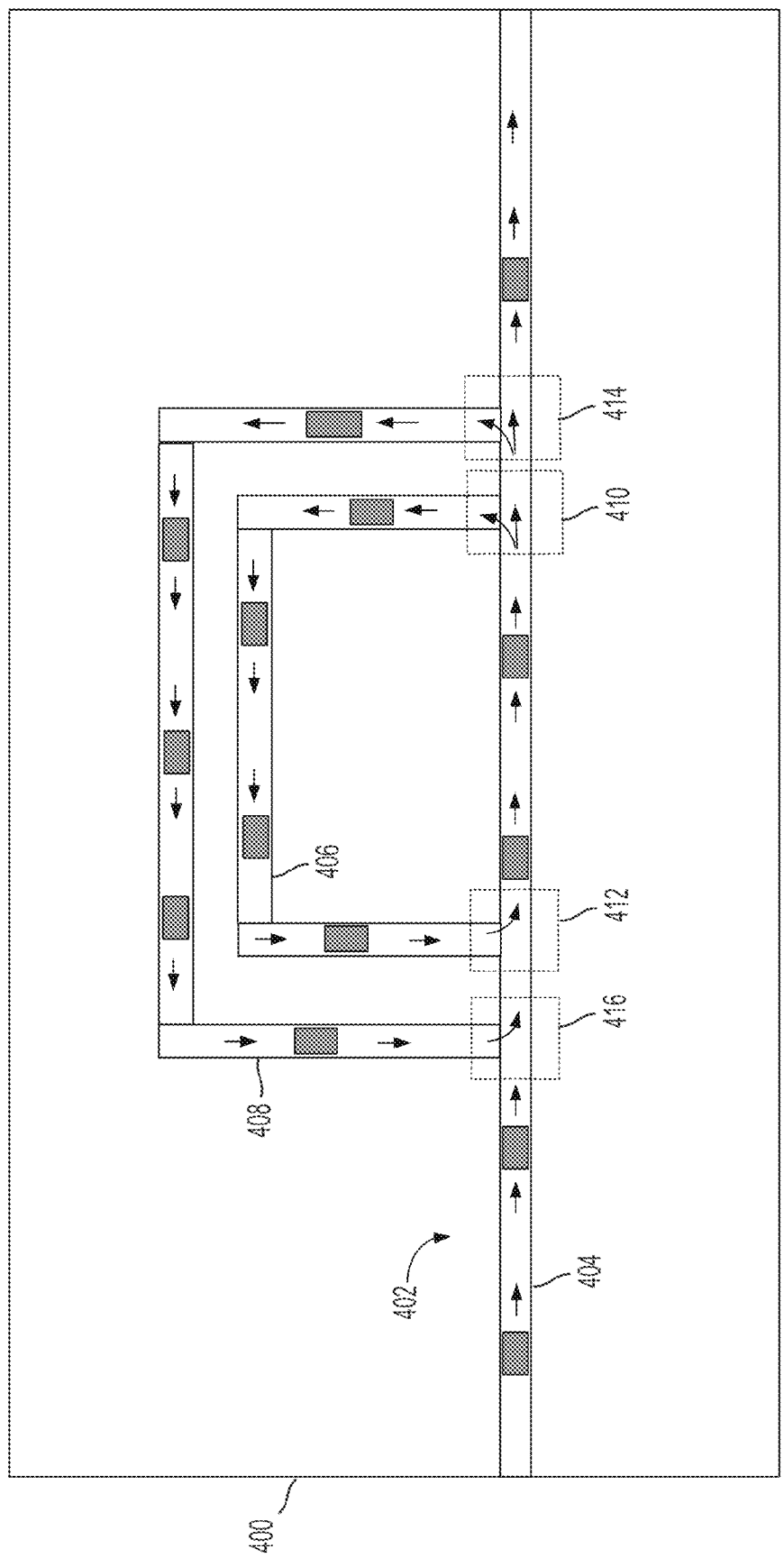
FIG. 4 depicts an additional example pallet-conveyor system.

FIG. 4 depicts another example pallet-conveyor system. Similar to the example implementation illustrated in FIG. 3, environment 400 includes a conveyor system 402 with another example configuration for transporting pallets to fulfill item requests. Conveyor system 402 includes delivery track 404, multiple recirculation loops (i.e., recirculation loop 406 and recirculation loop 408), and multiple diverter mechanisms (i.e., diverter mechanism 410, diverter mechanism 412, diverter mechanism 414, and diverter mechanism 416). In other implementations, conveyor system 402 can include more or less components, such as more or less recirculation loops or more or less diverter mechanisms.

As shown in FIG. 4, conveyor system 402 includes delivery track 404 configured to transport received pallets of items or individual items through a delivery area and may be configured to transition the pallets to a repossession area where mobile robotic devices can pick up and return the pallets to storage in environment 400. Delivery track 404 can be configured with a conveyor belt that is shared by recirculation loop 406 and recirculation loop 408 as illustrated. In particular, a portion of the loops of recirculation loop 406 and recirculation loop 408 corresponds to the same conveyor belt as delivery track 404.

Recirculation loop 406 is shown as the inner, smaller recirculation loop of conveyor system 402. As such, recirculation loop 406 may be configured to recirculate pallets within conveyor system 402 to keep the pallets close to the delivery area. Recirculation loop 406 shares a portion of delivery track 404 and can further use diverter mechanisms 410-412 to select pallets to circulate in recirculation loop 406.

Similar to recirculation loop 406, recirculation loop 408 can also circulate pallets within conveyor system 402. As shown, recirculation loop 408 has a bigger configuration positioned around recirculation loop 406, which can enable pallets positioned in recirculation loop 408 to travel more within recirculation lop 408 than recirculation loop 406. However, in some instances, recirculation loop 406 can maintain pallets longer than recirculation loop 408 when recirculation loop 406 transports the pallets at a slower pace. Additionally, a computing system may control operation of both recirculation loops 406-408 and can cause one or both to stop, reverse direction, or perform other possible operations. Recirculation loop 408 can utilize diverter mechanisms 414-416 to transfer pallets between delivery track 404 and recirculation loop 408.

Figure 5:
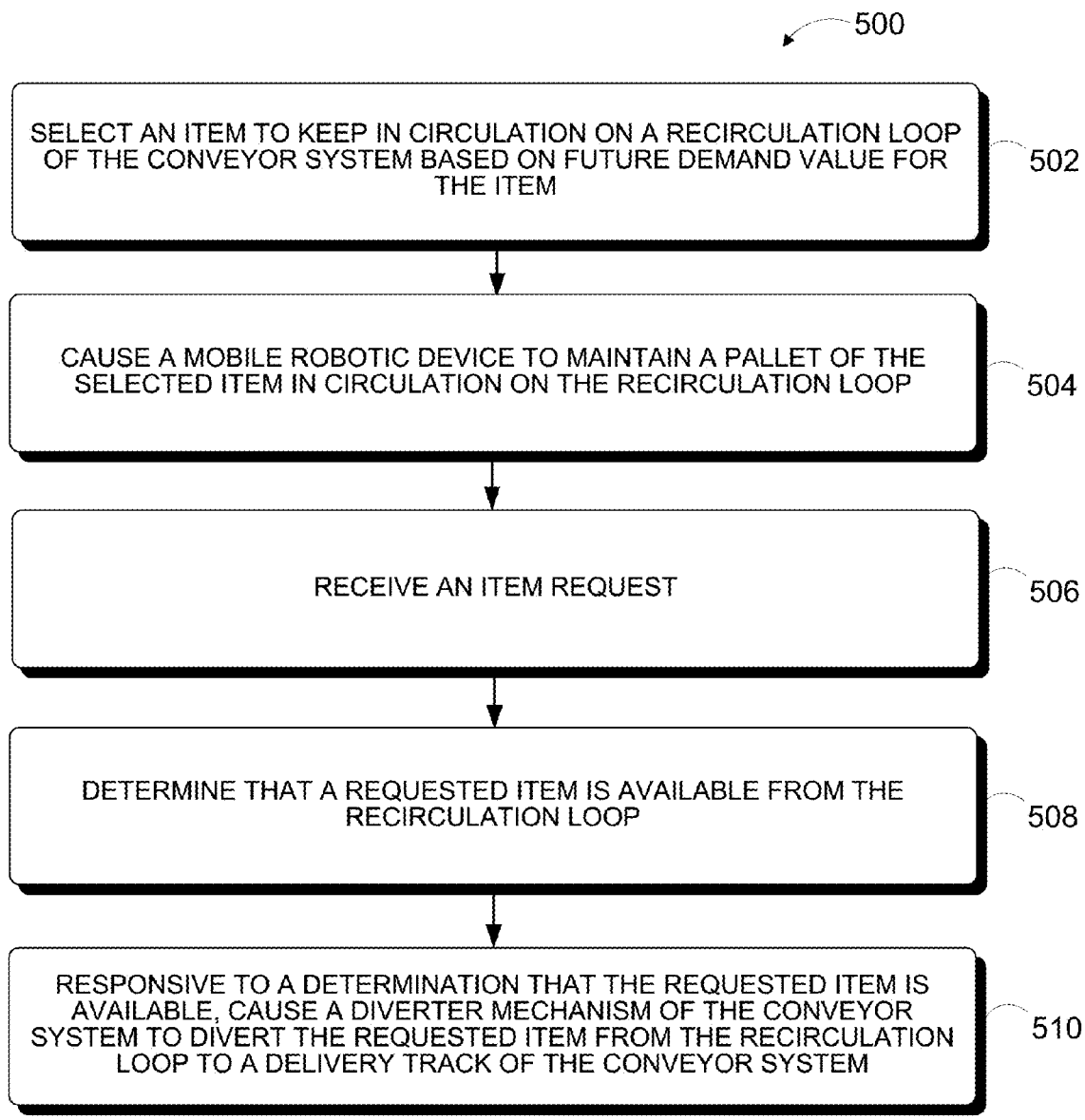
FIG. 5 is a flowchart of an example method for implementing a pallet-conveyor system.

FIG. 5 is a flowchart of an example method 500 for implementing a pallet-conveyor system. Method 500 represents an example method that may include one or more operations, functions, or actions, as depicted by one or more of blocks 502, 504, 506, 508, and 510, each of which may be carried out by computing system 200 described in FIG. 2A, but other systems can also be used. Those skilled in the art will understand that the flowchart described herein illustrate functionality and operation of certain implementations of the present disclosure. In this regard, each block of the flowchart may represent a module, a segment, or a portion of program code, which includes one or more instructions executable by a processor (e.g., processor 202) for implementing specific logical functions or steps in the process. The program code may be stored on any type of computer readable medium, for example, such as a storage device including a disk or hard drive (e.g., data storage unit 204).

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a control system, such as computing system 200 configured to control a conveyor system, may perform one or more blocks of method 500.

At block 502, method 500 includes selecting an item to keep in circulation on a recirculation loop of the conveyor system based on future demand value for the item. As indicated above, a control system (e.g., computing system 200) may be configured to control aspects of an environment, including mobile robotic devices and/or a conveyor system located therein. The computing system serving as the control system may instruct mobile robotic devices to perform operations, such as the transportation of pallets holding items between storage and the conveyor system. In some instances, the computing system can control and coordinate the delivery of pallets at the conveyor system to enable efficiently assembly of packages by pickers that fulfill item requests.

The computing system may also be configured to select an item or items to maintain within the conveyor system by placing the items or pallets holding the items in a recirculation loop of the conveyor system. More specifically, the computing system may select a pallet or pallets of items or the items individually to circulate within the conveyor system in the recirculation loop based on future demand for the items. For instance, the computing system may choose to place items that will likely be requested in subsequent item requests within in the recirculation loop so that these items are more easily available to pickers when the pickers are completing the incoming item requests. Placing items within the recirculation loop can reduce the number of trips required by vehicles transporting items between storage and the conveyor system.

The computing system may determine the future demand for items based on a variety of parameters within examples. For instance, the computing system can estimate future demand for items using previously received item requests.

In some implementations, the computing system may analyze prior order trends that correspond to the same period of the year to estimate future demand for items. As an example, the computing system may estimate that future demand for items, such as candy and Halloween costumes, will likely increase during October and further predict the future demand for the items based on related item requests from past Octobers. In another example, the computing system may determine future demand values for seasonal items (e.g., Christmas lights) based on past demand values for these items during a similar period. In an implementation, the computing system may receive information indicating the future demand for items from another computing device (e.g., a server).

The computing system may also select items for the recirculation based on other possible considerations. For example, the computing system may select items to keep in the recirculation loop by determining and using a delivery schedule that indicates times when mobile robotic devices or other vehicles will drop off pallets of items at the conveyor system. The computing system can determine the delivery schedule based on communications with mobile robotic devices and/or other vehicles. For instance, the computing system may control operations of mobile robotic devices (e.g., forklifts) delivering and removing pallets between the conveyor system and storage. The computing system may develop the delivery schedule based on information provided by the mobile robotic devices and other possible vehicles. Particularly, the computing system may receive information indicating delivery times and other transportation information from the robotic devices and vehicles. The computing system can also develop the delivery schedule based on instructions provided to the mobile robotic devices and other transportation vehicles. For instance, the computing system may develop the delivery schedule based on instructions that indicate which pallets to retrieve and expected delivery or removal times for the pallets.

As such, the computing system may configure the delivery instructions based on instructions provided to the mobile robotic devices that indicate which pallets to retrieve and when to deliver or remove the desired pallets with respect to the conveyor system. In some implementations, the computing system can adjust the delivery schedule using information provided by sensors operating in the environment, including information provided by sensors positioned on the mobile robotic devices and/or other vehicles. The computing system may use a determined delivery schedule when selecting items to keep in the conveyor system in the recirculation loop.

In another implementation, the computing system may select items to keep in circulation on the recirculation loop based on current or future sale promotions for the items. In particular, a sale promotion for a given item may cause a rise in incoming requests for that item since consumers may select the item due to a discount or the additional publicity awarded towards the item via the sale promotion. As such, the computing system may determine that holding one or more pallets holding promoted items in the recirculation loop of the conveyor system may help promote efficiency by keeping the promoted items closer to the pickers that assemble packages fulfilling the item requests. The computing system may use information indicating various sales for items in combination with other information (e.g., delivery schedule) when selecting pallets for circulating within the recirculation loop.

In an example implementation, the computing system controlling the conveyor system may select items to keep in circulation after factoring the weights of the items and/or weights of the pallets holding the items. For example, the computing system may consider keeping a pallet of heavier items in the recirculation loop when the future demand for the heavier items is high enough to warrant keeping the items close to the pickers and to avoid unnecessary stress upon mobile robotic devices or other vehicles that transport the pallets. In a similar example, the computing system may also factor the quantity of items positioned on a given pallet when determining whether or not to position that pallet in the recirculation loop. For instance, the computing system may maintain a pallet that holds a high number of items in the recirculation loop since that pallet contains enough items to fulfill a large number of incoming item requests.

In another implementation, the computing system may select pallets for the recirculation loop based on the quality of the items positioned on the pallets. For instance, the computing system may select a pallet containing fragile items to recirculate in the recirculation loop of the conveyor system to reduce the amount of transportation that the fragile items encounter via the forklifts or other vehicles moving the pallet between the conveyor system and storage.

In some implementations, when selecting items for the recirculation loop, the computing system may determine and use an order trend that may assist the computing system to predict future item requests. Similar to future demand, the computing system may consider various factors to develop an order trend that estimates future quantities of requests for particular items based on past orders, sale promotions, time of year, and other possible considerations. Additionally, the computing system controlling aspects of the conveyor system may be configured to select pallets for the recirculation loop based on other possible considerations within examples.

In a further implementation, the computing system may select items for the recirculation loop based on delivery times associated with the items. For instance, the computing system may position items that are associated with a same-day delivery option in the recirculation loop. Similarly, the computing system may also position items associated with other short-term delivery options (e.g., two-day delivery) in the recirculation loop in order to keep the items readily available for the pickers to access.

At block 504, method 500 includes causing a mobile robotic to maintain at least one pallet of each selected item in circulation on the recirculation loop. After selecting items for the recirculation loop, the computing system may further control one or more mobile robotic devices and/or other vehicles to maintain one or more pallets for each selected item within the recirculation loop. For instance, the computing system may provide instructions to autonomous forklifts or other types of vehicles to deliver pallets containing one or more of the selected pallets in a manner so that the pallets can enter into the recirculation loop.

In some examples, mobile robotic devices can deliver pallets holding the items or the items directly into the recirculation loop. For instance, in implementations the recirculation loop corresponds to a conveyor belt, a given vehicle can drop off a pallet directly on the conveyor belt. In other examples, mobile robotic devices may deliver the pallets holding the items or the items on other portions of the conveyor system. To illustrate, a mobile robotic device may deliver a pallet holding a type of selected items on the delivery track that can transport the pallet into the recirculation loop with assistance from a diverter mechanism. In some instances, the computing system may determine that a selected item is already positioned on a pallet on the delivery track and cause a diverter mechanism to reposition the pallet in the recirculation loop.

At block 506, method 500 includes receiving an item request. The computing system or another system may receive items requests for one or more items stored in the environment that can correspond to sale orders received from businesses or consumers or other types of item requests. As an example illustration, the computing system may receive customer orders containing information indicating which items are requested and a delivery address for sending a package containing the requested items. In some implementations, a given item request can include identification labels (e.g., UPC or SKU labels) that may assist the computing system in identifying items. As such, the computing system may process the incoming item requests to determine which items to position at the delivery area or another location where pickers can assemble packages that fulfill the item requests.

In an example implementation, the computing system may configure the conveyor system and mobile robotic devices to complete item requests (e.g., orders) based on the delivery dates associated with each item requests. For example, a consumer may provide additional funds to receive an order at an earlier delivery date (e.g., same day delivery). As such, the computing system may factor the delivery date when determining the order for completing the item requests. Items requests can also be fulfilled based on sales branch, delivery route, or other possible considerations. In a further implementation, the computing system controlling the conveyor system may sort received item requests by number and type of products required to complete the request.

At block 508, method 500 includes determining that a requested item is available from the recirculation loop. In response to receiving an item request, the computing system may determine that one or more items within the item request are positioned in the recirculation loop. For instance, the computing system may analyze the item request to identify any requested items that have been previously directed to the recirculation loop. The computing system may use item identification marks or other processes to detect when items are located in the recirculation loop so that the computing system can identify when a requested item is in the recirculation loop.

At block 510, method 500 includes, responsive to a determination that the requested item is available, causing a diverter mechanism of the conveyor system to divert the requested item from the recirculation loop to a delivery track of the conveyor system. For instance, after determining that a requested item is located in the recirculation loop, the computing system can cause the pallet holding the requested item to change locations (e.g., switch conveyor belts) so that the requested item enters the delivery area for the pickers to obtain.

In an example implementation, the computing system may maintain a list or other form that indicates the types of items currently positioned within the recirculation loop. As such, the computing system can cause the diverter mechanism to divert a pallet or pallets holding the items from the recirculation loop to a delivery track of the conveyor system that can transport the pallets to a delivery area where the pickers may select items from the pallets to fulfill the item requests. As previously discussed, a diverter mechanism may be configured to allow a given pallet to recirculate on the recirculation loop and also to divert the given pallet to the delivery track.

In some implementations, method 500 may further include the computing system causing a mobile robotic device to obtain and load pallets of remaining requested items onto the conveyor system, such that the remaining requested items are provided at the delivery area. In some instances, the computing system may determine that the recirculation loop does not include one or more items requested within a received item request. As a result, in order to complete a package that fulfills the entire item request, the computing system may provide instructions to robotic devices and/or other vehicles to pick up remaining items from storage and deliver the items to the conveyor system so that the pickers can obtain the items.

In a further aspect, the computing system can provide instructions to one or more mobile robotic devices to immediately retrieve requested items that are not located within the recirculation loop. For instance, the computing system can receive an item request that includes multiple items and determine that one or more items are located only within storage. Accordingly, the computing system can provide instructions to robotic devices to obtain the requested items from storage. In a further example, the computing system may also determine that a requested item is currently being transported by a robotic device to the conveyor system. As such, the computing system may provide instructions for the robotic device to speed up that item's delivery to the conveyor system and/or change the location of the delivery by the robotic device to position the item closer to the pickers. Additionally, in some instances, the computing system may not provide any instructions after determining that a robotic device is already transporting a remaining requested item to the conveyor system.

In another implementation, the computing system may relay instructions to a mobile robotic device or other type of vehicle to add obtaining a pallet holding a given item to the device's list of tasks. Particularly, the computing system may instruct the robotic device to obtain the pallet of the requested item after completing other tasks already assigned tasks.

In some implementations, method 500 may further include a computing system causing a picker device to remove the requested items from pallets at the delivery area in order to fulfill the one or more item requests. As indicated above, the computing system may utilize the conveyor system to position items in a delivery area that enables pickers to select the items to fulfill the received item requests.

In an example implementation, the computing system may control one or more operations of the pickers. For instance, the computing system may instruct the pickers to select requested items and assemble packages to fulfill item requests. As such, the pickers can correspond to various types of robotic devices (e.g., robotic arm 116) or other possible mechanical structures. The quantity, position, and other parameters relating to the pickers can vary within implementations. For instance, a larger conveyor system may include more pickers than a smaller conveyor system. Additionally, a conveyor system can include multiple delivery areas containing pickers to increase the overall output of the conveyor system.

In another example implementation, people can serve as pickers and select items from pallets on the conveyor system to assemble packages according to received item requests. As such, an example conveyor system can include one or more conveyor belts (e.g., delivery track) or other physical structures serving as a physical barrier that separates the area containing robotic devices and vehicles transporting pallets of items to the conveyor system and the people assembling packages using items from the pallets.

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:

1. A system comprising:
   a conveyor system comprising: (i) a delivery track arranged to move pallets to a delivery area, (ii) a recirculation loop, and (iii) a diverter mechanism, wherein the conveyor system is located in an environment comprising storage for a plurality of items, and wherein the diverter mechanism is operable to divert a pallet to the delivery track; and
   a control system configured to:
   compare future demand values for at least two of the plurality of items;
   based on the comparison, select an item to keep in circulation on the recirculation loop;
   cause a mobile robotic device to maintain a pallet of the selected item in circulation on the recirculation loop;
   receive an item request;
   determine that a requested item is available from the recirculation loop; and
   cause the diverter mechanism to divert the requested item from the recirculation loop to the delivery track.

2. The system of claim 1, wherein the control system is further configured to:
   cause a mobile robotic device to obtain a pallet of a remaining requested item and load the pallet onto the conveyer system, such that the remaining requested item is provided to the delivery area; and
   cause a picker device to remove one or more requested items from pallets at the delivery area in order to fulfill the item request.

3. The system of claim 1, wherein the mobile robotic device is an autonomous forklift.

4. The system of claim 1, wherein the conveyor system further comprises a repossession area, and wherein the delivery track is further arranged to move pallets from the delivery area to the repossession area.

5. The system of claim 4, further comprising a mobile robotic device configured to obtain a pallet on the conveyor system from the repossession area and to return the pallet to a storage located in the environment.

6. The system of claim 1, wherein the control system further is configured to select the item to keep in circulation on the recirculation loop also based on a storage location of the pallet holding the item in the environment.

7. The system of claim 1, wherein the control system further is configured to select the item to keep in circulation on the recirculation loop also based on an order trend determined using past demand values for the item.

8. The system of claim 1, wherein the control system further is configured to select the item to keep in circulation on the recirculation loop also based on a quality value of the item.

9. A method comprising:
   selecting, at a computing system controlling a conveyor system located in an environment comprising storage for a plurality of items, an item to keep in circulation on a recirculation loop of the conveyor system based on future demand value for the item;
   causing a mobile robotic device to maintain a pallet of the selected item in circulation on the recirculation loop;
   receiving, at the computing system, an item request;
   determining that a requested item is available from the recirculation loop; and
   responsive to a determination that the requested item is available, causing a diverter mechanism of the conveyor system to divert the requested item from the recirculation loop to a delivery track of the conveyor system, wherein the diverter mechanism is operable to divert the pallet to the delivery track, and wherein the delivery track is arranged to move pallets to a delivery area.

10. The method of claim 9, further comprising:
causing a mobile robotic device to obtain and load a pallet of a remaining requested item onto the conveyor system, such that the remaining requested item is provided at the delivery area; and
causing a picker device to remove requested items from pallets at the delivery area in order to fulfill the item request.

11. The method of claim 9, wherein selecting the item to keep in circulation on the recirculation loop of the conveyor system is further based on sale promotions for the item.

12. The method of claim 9, wherein selecting the item to keep in circulation on the recirculation loop of the conveyor system is further based on a weight of a pallet holding the item.

13. The method of claim 9, wherein selecting items to keep in circulation on the recirculation loop of the conveyor system is further based on a time of year and seasonality of the items.

14. The method of claim 9, wherein causing a mobile robotic device to maintain a pallet of the selected items in circulation on the recirculation loop comprises:
providing instructions to a mobile robotic device to deliver a pallet of each selected item to a portion of the recirculation loop.

15. The method of claim 9, further comprising:
responsive to receiving the item request, determining a delivery schedule that indicates when the conveyor system will receive pallets that include items requested in the item request that are not available from the recirculation loop.

16. The method of claim 9, further comprising:
determining a delivery schedule for requested items at the delivery area;
based at least in part on the delivery schedule, identifying pallets for the recirculation system.

17. A non-transitory computer-readable medium configured to store instructions, that when executed by a computing system configured to control a conveyor system, and to cause the computing system to perform functions comprising:
comparing future demand values for at least two of a plurality of items located in an environment comprising the conveyor system;
based on the comparison, selecting an item to keep in circulation on a recirculation loop of the conveyor system;
causing a mobile robotic device to maintain a pallet of the selected item in circulation on the recirculation loop;
receiving an item request;
determining that a requested item is available from the recirculation loop; and
causing a diverter mechanism to divert the requested item from the recirculation loop to a delivery track, wherein the delivery track is arranged to move pallets to a delivery area, and wherein the diverter mechanism is operable to allow a pallet to recirculate on the recirculation loop.

18. The non-transitory computer-readable medium of claim 17, wherein selecting the item to keep in circulation on the recirculation loop comprises:
determining an inventory indicative of items in circulation on the recirculation loop.

19. The non-transitory computer-readable medium of claim 18, wherein determining that a requested item is available from the recirculation loop comprises:
determining that the requested item is available based on the determined inventory.

20. The non-transitory computer-readable medium of claim 17, wherein the functions further comprise:
determining a mobile robotic device for obtaining a pallet of a remaining requested item based on information from the mobile robotic device, wherein the information indicates a current location and operation of the mobile robotic device.

\* \* \* \* \*